(12) United States Patent
Miyashiro et al.

(10) Patent No.: US 7,073,617 B2
(45) Date of Patent: Jul. 11, 2006

(54) VEHICLE BODY FRAME FOR MOTORCYCLE

(75) Inventors: Shidehiko Miyashiro, Shizuoka-ken (JP); Takehisa Katsura, Shizuoka-ken (JP); Takayoshi Fukuda, Shizuoka-ken (JP); Sin Yokomizo, Shizuoka-ken (JP); Takushiro Shiraishi, Shizuoka-ken (JP); Hiroshi Yamaoka, Shizuoka-ken (JP); Norikazu Unno, Shizuoka-ken (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/476,468

(22) PCT Filed: Dec. 26, 2002

(86) PCT No.: PCT/JP02/13733

§ 371 (c)(1),
(2), (4) Date: Apr. 5, 2004

(87) PCT Pub. No.: WO03/057552

PCT Pub. Date: Jul. 17, 2003

(65) Prior Publication Data

US 2004/0154852 A1    Aug. 12, 2004

(30) Foreign Application Priority Data

Dec. 28, 2001  (JP)  ............................. 2001-400203
Dec. 28, 2001  (JP)  ............................. 2001-400204
Dec. 28, 2001  (JP)  ............................. 2001-400205

(51) Int. Cl.
*B62M 7/00* (2006.01)
(52) U.S. Cl. ................................. 180/219; 280/281.1
(58) Field of Classification Search ................ 180/219, 180/227; 280/274, 281.1, 288, 288.2, 288.3, 280/279, 871
See application file for complete search history.

(56) References Cited

U.S. PATENT DOCUMENTS 4,911,474 A * 3/1990 Fukuda ....................... 280/835
6,446,996 B1 * 9/2002 Horii ......................... 280/281.1
6,481,522 B1 * 11/2002 Adachi ....................... 180/219

FOREIGN PATENT DOCUMENTS

JP    58-157537    9/1983

(Continued)

*Primary Examiner*—Anne Marie Boehler
(74) *Attorney, Agent, or Firm*—Hogan & Hartson LLP

(57) ABSTRACT

In a body frame for a motorcycle mounted with an engine unit 11 and provided with a main frame 2a by which a front fork 4 and rear arms 7 are supported, the main frame 2a includes: a head pipe unit 20 which extends obliquely downward to a rear of a vehicle from a head pipe 3 and so as to expand in a vertical direction; a down frame 21 which is connected to a front part at lower end of the head pipe unit 20; and left and right rear arm brackets 10 which are stretched and connected to a rear end of the down frame 21 and a rear part at lower end of the head pipe unit 20, and the head pipe unit 20 is an aluminum die-cast molded product, and the down frame 21 and the left and right rear arm brackets 10 are aluminum forged molded products.

13 Claims, 13 Drawing Sheets

FOREIGN PATENT DOCUMENTS

| | | |
|---|---|---|
| JP | 59-42783 | 3/1984 |
| JP | 59-70275 | 4/1984 |
| JP | 60-183689 | 12/1985 |
| JP | 61-59186 | 4/1986 |
| JP | 61-160375 | 7/1986 |
| JP | 61-235283 | 10/1986 |
| JP | 61-291281 | 12/1986 |
| JP | 62-26177 | 2/1987 |
| JP | 62-77292 | 4/1987 |

* cited by examiner

Fig. 10
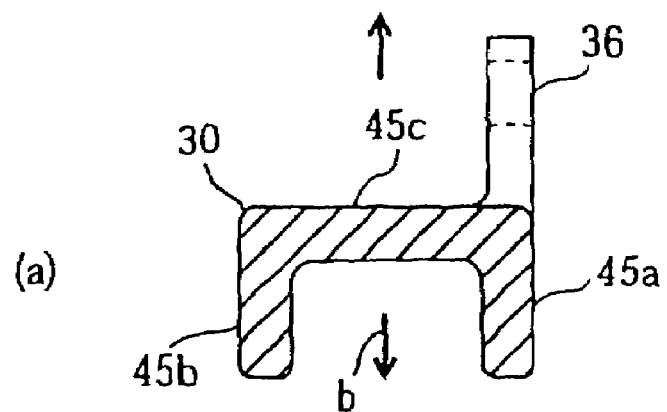
(a)
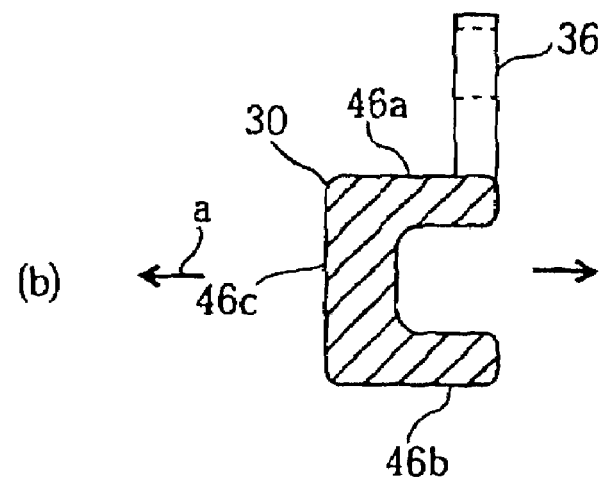
(b)
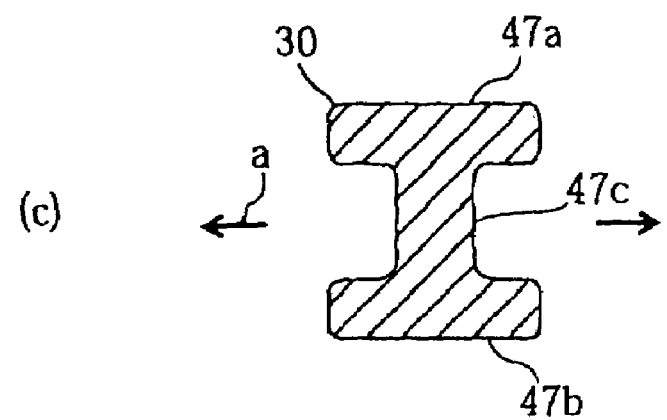
(c)

7,073,617 B2

VEHICLE BODY FRAME FOR MOTORCYCLE

TECHNICAL FIELD

The present invention relates to a body frame for a motorcycle which is mounted with an engine unit and is provided with a main frame by which a front fork and rear arms are supported.

BACKGROUND ART

For example, in a motorcycle for a motocross race, because of its use, the motorcycle may hits a road surface hard due to landing from a high place at the time of jumping. Thus, it is required to increase rigidity and strength of a body frame against impact, and it is also required to reduce weight of a body as much as possible.

As a body frame of this type, as shown in FIG. 13, conventionally, a structure may be adopted in which a main pipe (tank rail) 80 of iron extending obliquely downward to a rear of a vehicle is welded and joined to an upper end of a head pipe (not shown) of iron and a down tube 81 of iron also extending downward to the rear of the vehicle is welded and joined to a lower end thereof, and left and right gussets 82, 82 are welded and joined to front side parts of the down tube 81 and the main pipe 80, whereby the head pipe part is closed in a section thereof. In addition, a guide pile 83 opening in a direction of the vehicle width may be welded and joined between the left and right gussets 82 to arrange a clutch cable 84 or the like in the guide pipe 83

Incidentally, in the structure in which iron pipes are welded and joined as in the conventional body frame, although strength can be secured, there is a limit in realizing reduction of a body weight.

On the other hand, recently, from the viewpoint of realizing reduction in a body weight while securing strength, it has been discussed to manufacture a body frame from aluminum alloy, and this has been partly to put to practical use. In the case in which this body frame made of aluminum alloy is adopted, in order to secure strength equal to or larger than that of the conventional iron pipe, it is conceivable to weld and join an aluminum pipe material formed by extrusion molding.

In addition, as a general body frame for a motorcycle, there is one which has a structure provided with a head pipe unit constituted by joining a frame member to a head pipe, a down tube extending downward to a rear of a vehicle from a front part at lower end of the head pipe unit, and rear arm brackets extending in a vertical direction, which joins a rear end of the down tube and a lower end of the head pipe unit, and an engine unit is mounted in this body frame.

Further, as the down tube, conventionally, there is one which has a structure in which left and right down tube main bodies are welded and joined by plural cross pipes extending in a vehicle width direction.

However, in the case in which the aluminum pipe material formed by extrusion molding is adopted, a thickness of the pipe material is constant in a direction of extrusion. Therefore, there is a concern that, if a thickness of a portion requiring large strength is secured, a film thickness of a portion not requiring large strength is also increased and, as a result, an effect of reducing a vehicle weight cannot be obtained despite the fact that the body frame is made of aluminum alloy.

In addition, in the case in which the extrusion molded product is adopted, there is a problem in that bending and deformed molding are difficult, and a degree of freedom with respect to a shape, a size, and the like is low. Therefore, the body frame is formed by welding a large number of linear short molded products, and there is a problem in that strength is fluctuated so much easier for an increase in welded portions, and cost increases.

In addition, in the conventional body frame, since the structure is adopted in which the main pipe and the down tube are welded and joined to the head pipe, respectively, and the left and right gussets are welded and joined thereto, there is a problem in that a structure around the head pipe is complicated and there are many welded portions, strength is easily fluctuated, and cost increases.

Further, as in the conventional down tube, in the case in which the structure is adopted in which the left and right down tube main bodies are welded and joined by the plural cross pipes, strength is fluctuated so much easier for an increase in the welded portions, and cost increases so much more for an increase in the number of components.

Moreover, in the conventional down tube, there is a problem in that deformation due to welding easily occurs, straightening may be performed by post processing in order to increase an assembly accuracy of the engine unit, and productivity is low.

It is an advantage of the present invention to provide a body frame for a motorcycle which, in the case in which a body frame of aluminum alloy is adopted, can reduce a body weight while securing rigidity and strength and can further increase a degree of freedom of a shape, a size, and the like of the frame and prevent fluctuation of strength, and can also reduce cost.

It is another advantage of the present invention to provide a body frame for a motorcycle which can prevent fluctuation of strength by reducing welded portion around a head pipe and can also reduce cost.

It is yet another advantage of the present invention to provide a body frame for a motorcycle which can prevent fluctuation of strength by reducing welded portions of a down tube, and can also reduce cost and, moreover, can improve productivity by making straightening work by post treatment unnecessary.

SUMMARY OF THE INVENTION

According to an embodiment of the present invention, a body frame for a motorcycle mounted with an engine unit and provided with a main frame by which a front fork and rear arms are supported, characterized in that the main frame includes a head pipe unit which extends obliquely downward to a rear of a vehicle from a head pipe and so as to expand in a vertical direction; a down frame which is connected to a front part at lower end of the head pipe unit and further extends to the rear of the vehicle; and rear arm brackets which are stretched and connected to a rear end of the down frame and a rear part at lower end of the head pipe unit. At least one of which is an aluminum die-cast molded product and the rest are aluminum forged molded products, or all of which are aluminum forged molded products. The head pipe unit is an aluminum die-cast molded product or an aluminum forged molded product, and the down frame and the rear arm brackets are aluminum forged molded product. A sectional shape of the head pipe unit, the down frame, and the rear arm brackets is an opened section.

The head pipe unit is a head pipe unit generally I-shaped in a cross section thereof which is constituted by integrally forming an upper main frame section with a rectangular shape in a section thereof extending obliquely downward to the rear of the vehicle from the upper end of the head pipe, a lower main frame section with a rectangular shape in a section thereof extending downward to the rear of the vehicle from the lower end of the head pipe, and gusset sections of a vertical wall shape which closes a space surrounded by the head pipe and the upper and lower main frame sections and whose vehicle width dimension is set smaller than a vehicle width dimension of the respective main frame sections. The down frame is constituted by integrally forming left and right down frame sections and upper and lower cross member sections, which connect the left and right down frame sections each other, with mold forging.

According to an embodiment of the present invention, a body frame for a motorcycle includes a head pipe unit generally I-shaped on a cross section thereof which is constituted by integrally forming an upper main frame section with a rectangular shape in a section thereof extending obliquely downward to the rear of the vehicle from the upper end of the head pipe. A lower main frame section with a rectangular shape in a section thereof extends downward to the rear of the vehicle from the lower end of the head pipe. Gusset sections of a vertical wall shape are provided which close a space surrounded by the head pipe and the upper and lower main frame sections and whose vehicle width dimension is set smaller than a vehicle width dimension of the respective main frame sections. The head pipe unit includes an aluminum die-cast molded product or an aluminum forged molded product constituted by setting a direction for die cutting of a mold to a vehicle width direction. Dimensions in a vehicle width direction and a height direction of the lower main frame section are set larger than dimensions in a vehicle width direction and a height direction of the upper main frame section. Vehicle-mounted components or body components are attached to a recessed portion formed by the upper and lower main frame sections and the gusset sections. Through-holes for passing an operation cable or electric wiring from one side to the other side in the vehicle width direction are formed in the gusset sections. An engine suspending bracket section is integrally formed with the gusset sections.

According to another embodiment of the present invention, a body frame for a motorcycle includes a head pipe unit constituted by joining a frame member to a head pipe; a down frame extending downward to a rear of a vehicle from a front part at lower end of the head pipe unit; and rear arm brackets connecting the down frame and a rear part at lower end of the head pipe unit. The down frame is constituted by integrally forming left and right down frame sections and upper and lower cross member sections, which connect the left and right down frame sections each other, with mold forging. The lower cross member section connects rear ends of the left and right down frame sections to each other, and a pair of left and right link bracket sections supporting a rear wheel suspending device are integrally formed in the cross member section so as to protrude to the rear of the vehicle. A maintenance opening for change pedal opening in a vertical direction is formed in a connecting portion of rear ends of the left and right down frame sections and the lower cross member section or in a connecting portion of the rear ends, the lower cross member section, and lower ends of the rear arm brackets. An engine bracket section is integrally formed with the left and right down frame sections. The left and right down frame sections have a sectional shape of a generally downward C shape and are formed such that a lower surface of a vertical wall on an outer side of the vehicle is placed higher than a lower surface of a vertical wall on an inner side of the vehicle. A cover is disposed in a recessed portion opening downward of the left and right down frame sections so as to cover the recessed portion or foaming resin is filled in the recessed portion.

BRIEF DESCRIPTION OF THE DRAWINGS

FIG. 10 is a view showing a sectional shape of a down frame section according to a modification of the embodiment.

DETAILED DESCRIPTION OF THE PREFERRED EMBODIMENTS

An embodiment of the present invention will be hereinafter described based upon the accompanying drawings.

Figure 1:
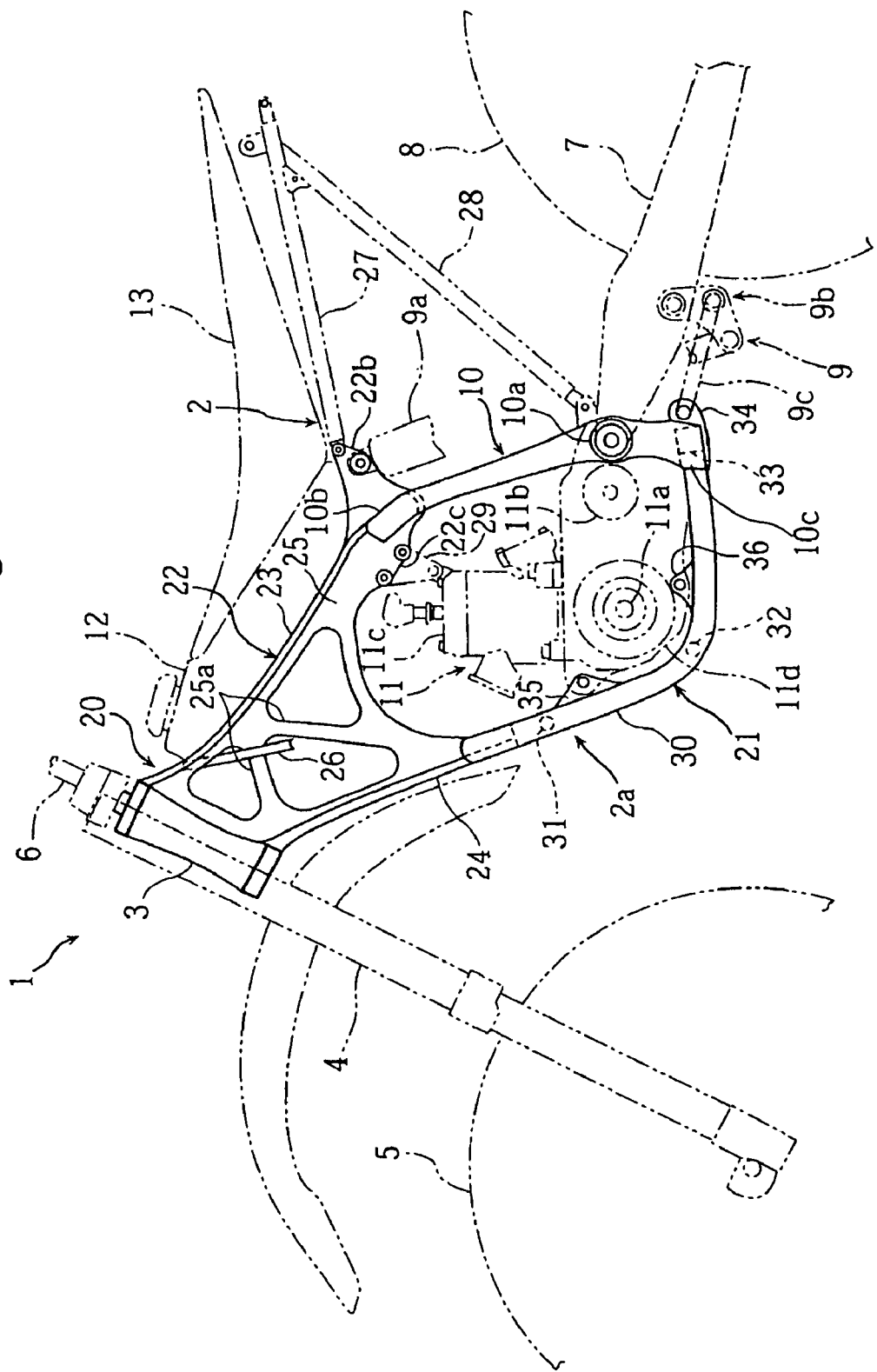
FIG. 1 is a left side view of a motorcycle in which a body frame according to an embodiment of the present invention is adopted.
Figure 2:
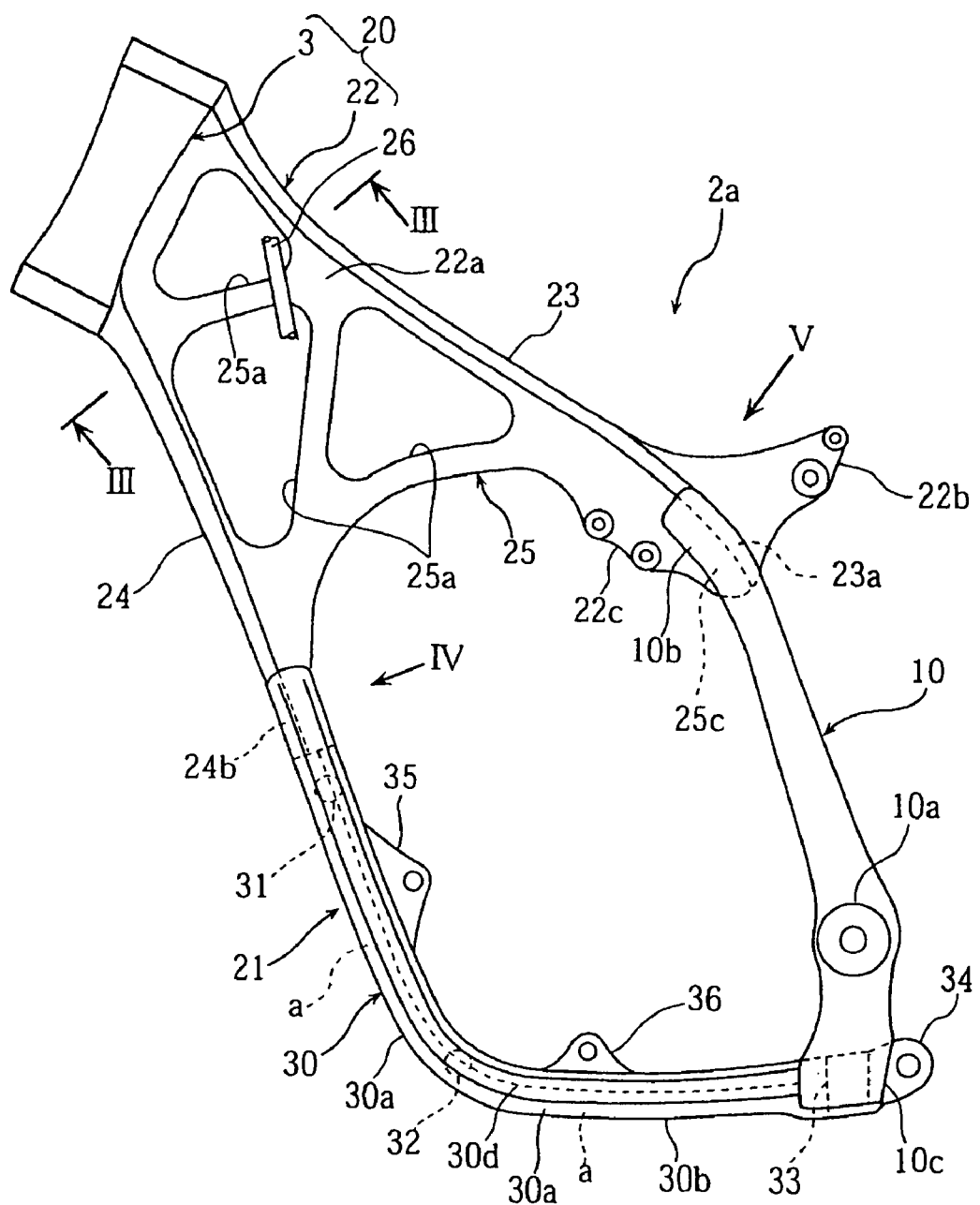
FIG. 2 is a left side view of the body frame.
Figure 3:
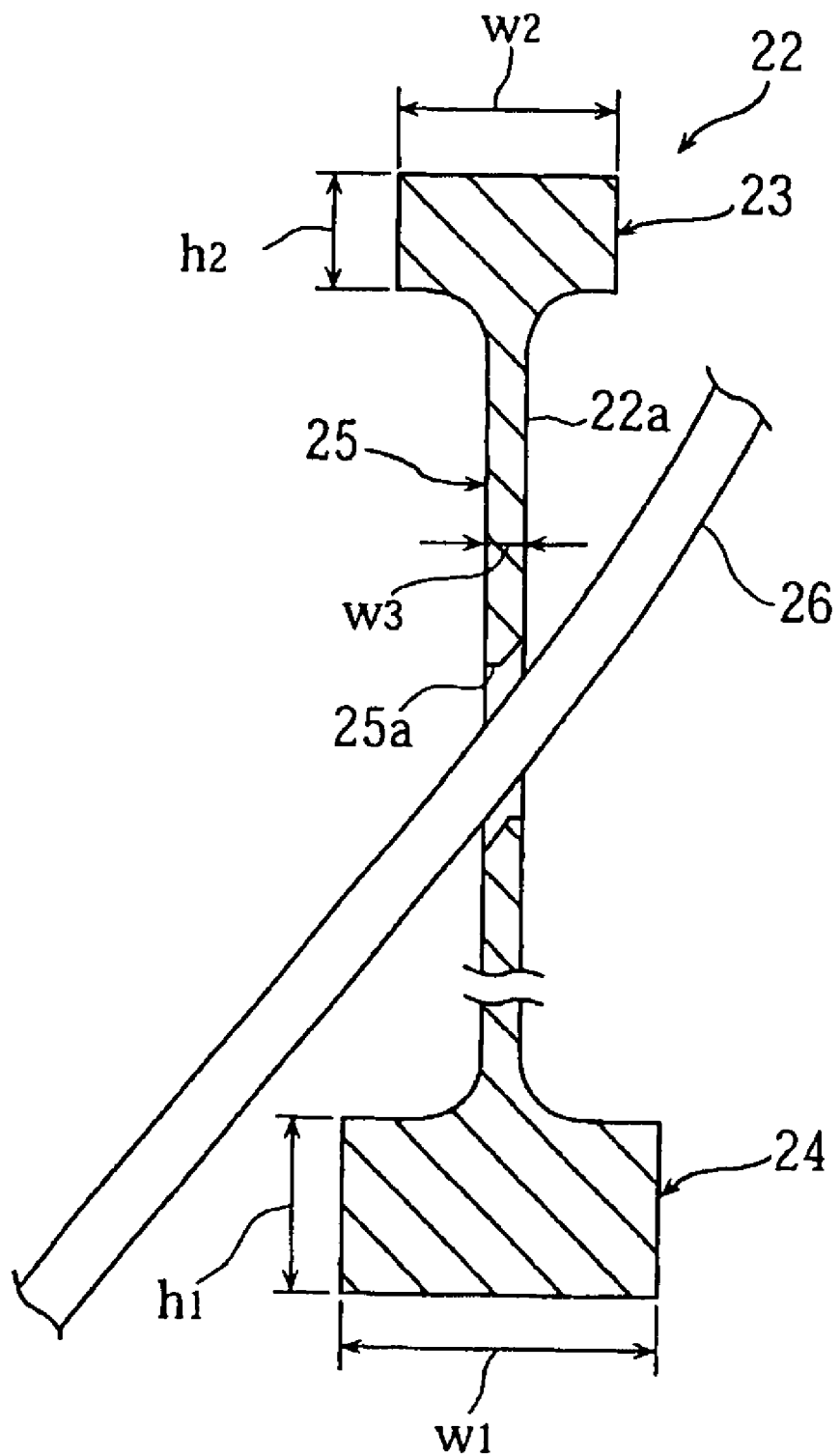
FIG. 3 is a sectional view (sectional view along line III—III of FIG. 2) of a head pipe unit of the body frame.
Figure 4:
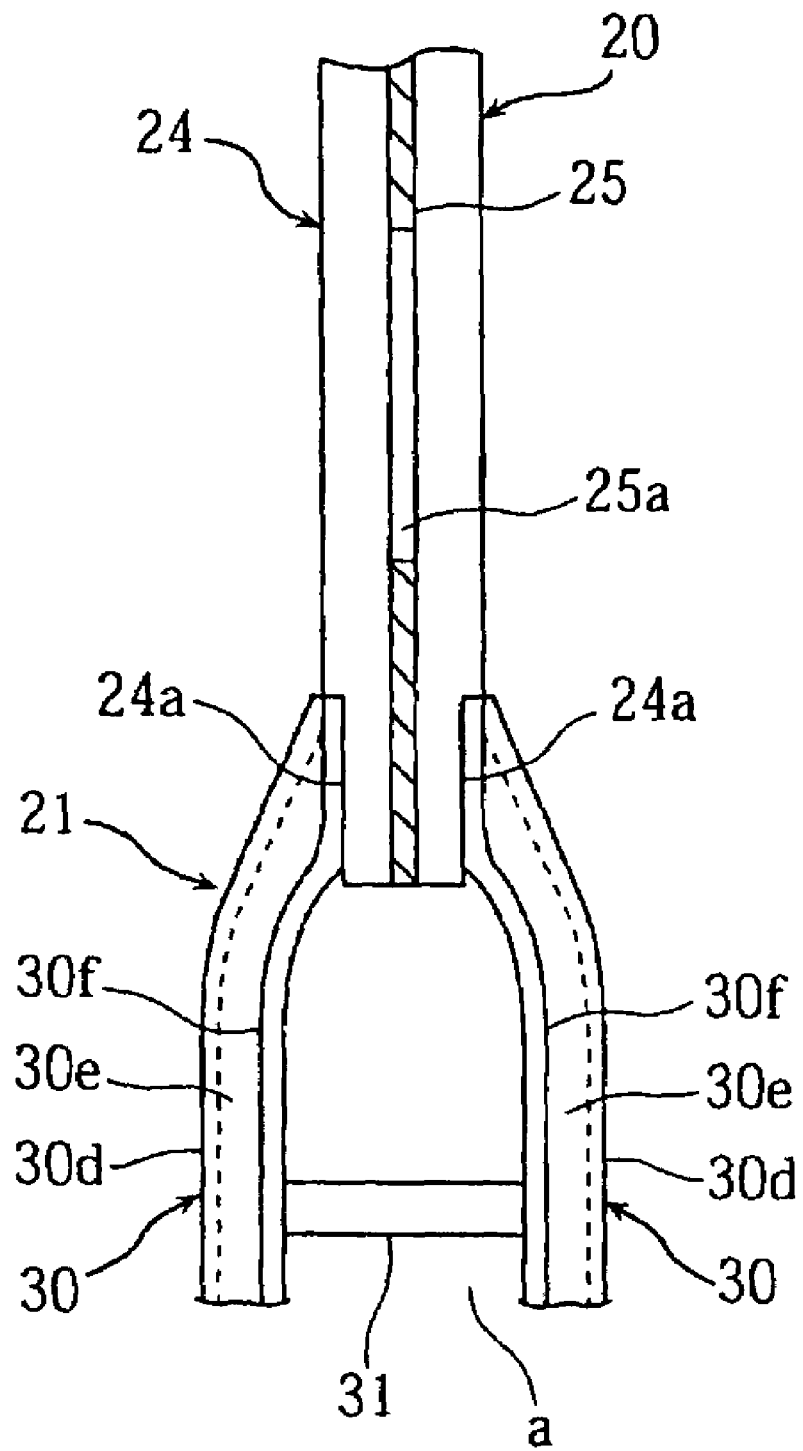
FIG. 4 is a IV arrow view of FIG. 2 showing a joint portion of the head pipe unit and a down frame.
Figure 5:
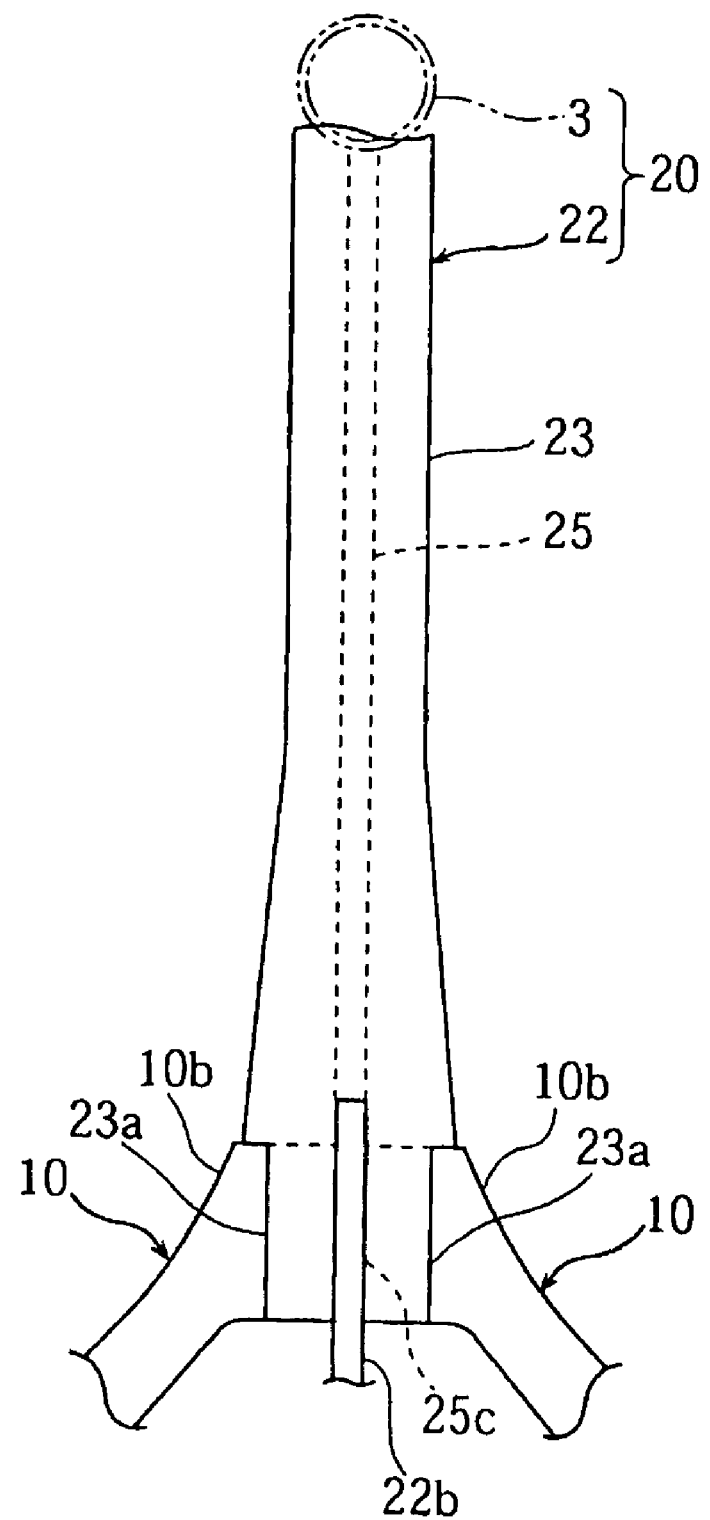
FIG. 5 is a V arrow view of FIG. 2 showing a joint portion of the head pipe unit and rear arm brackets.
Figure 6:
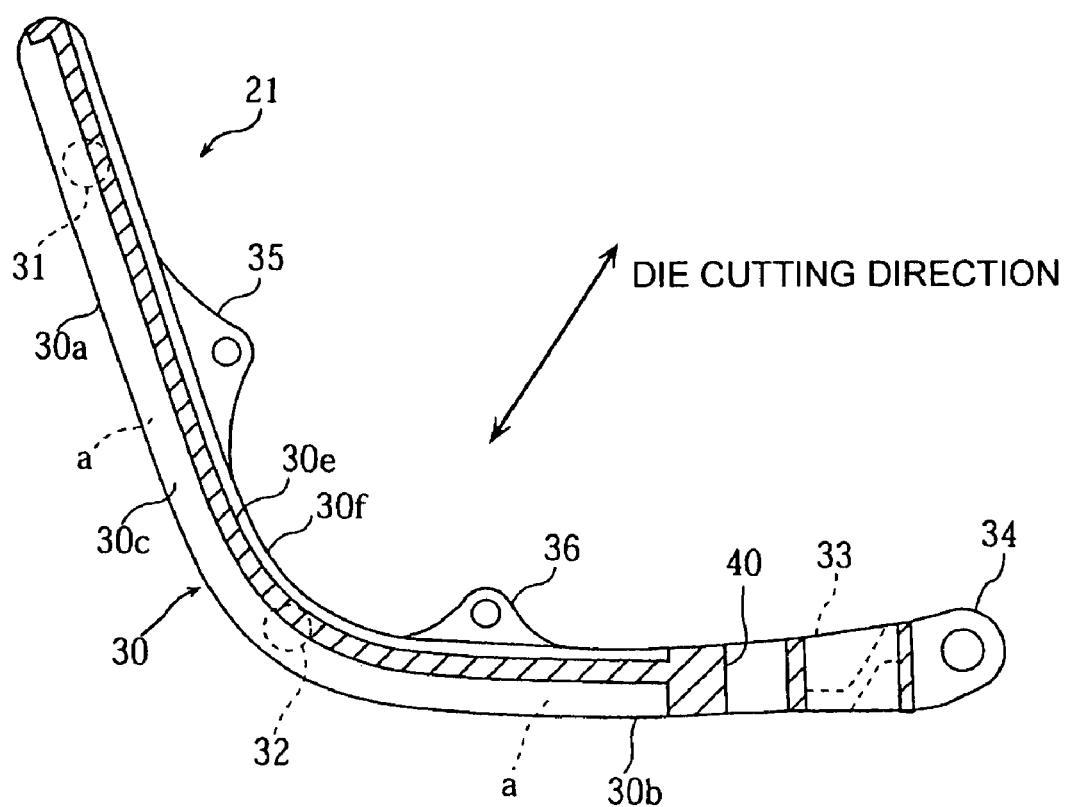
FIG. 6 is a sectional side view (sectional view along line VI—VI of FIG. 8) of the down frame.
Figure 7:
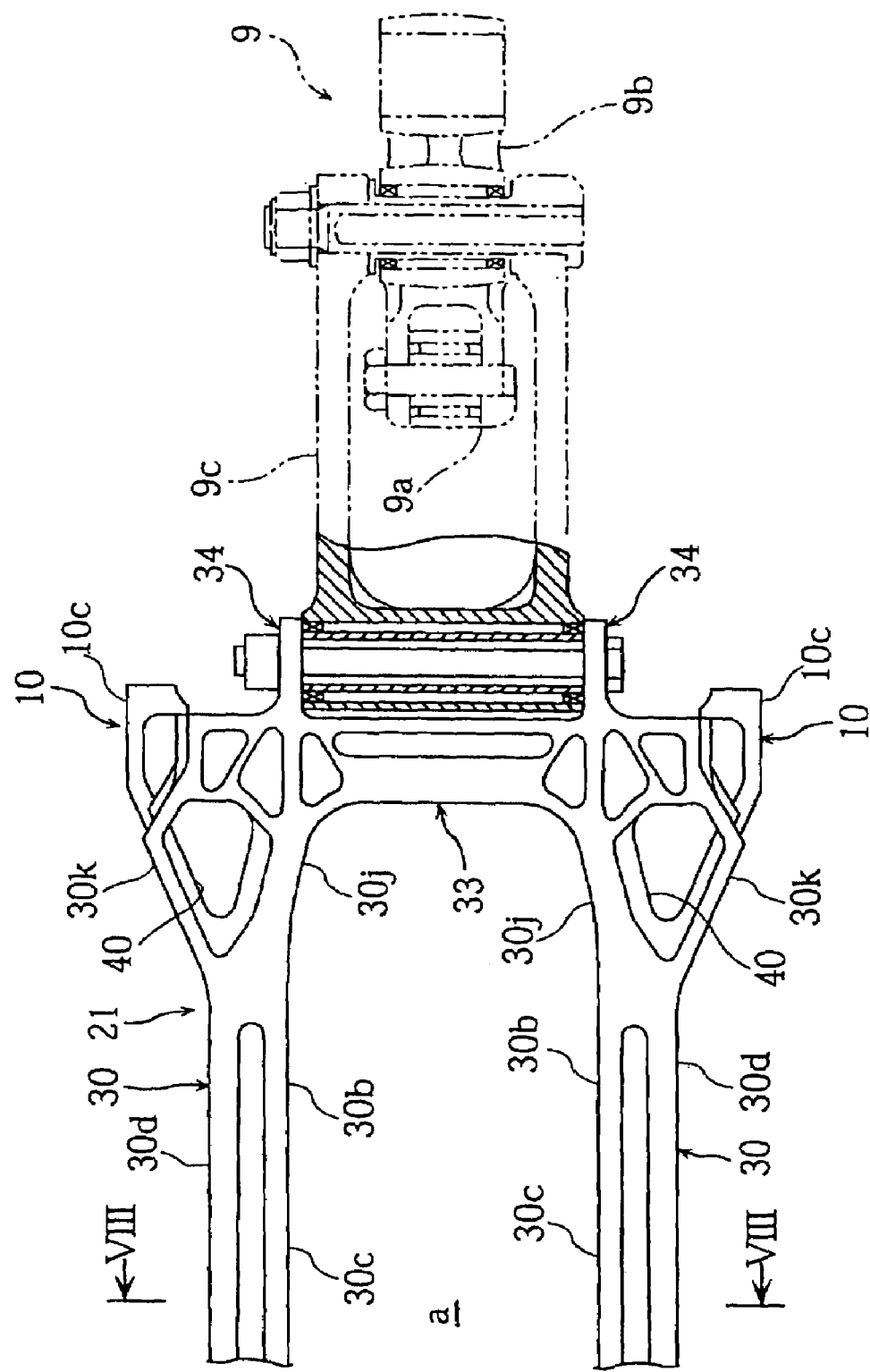
FIG. 7 is a bottom view of a rear end of the down frame.
Figure 8:
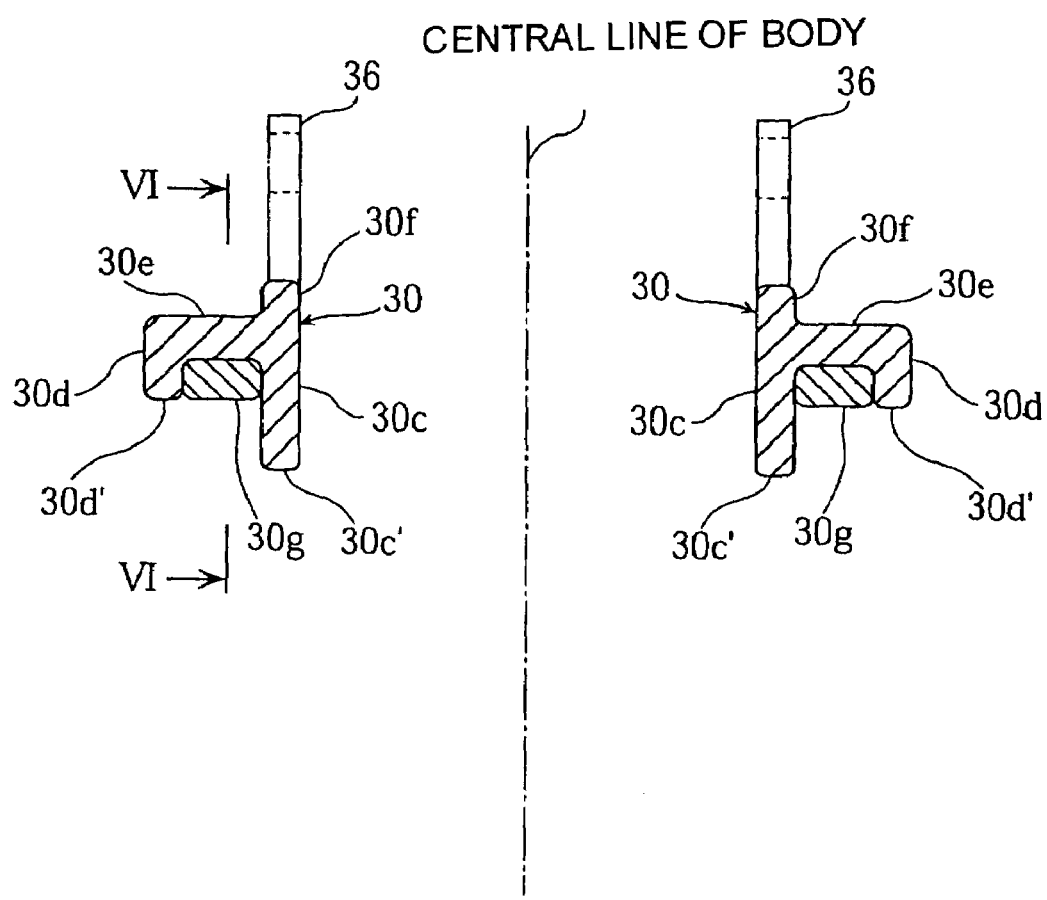
FIG. 8 is a sectional rear view (sectional view along line VIII—VIII of FIG. 7) of the down frame.
Figure 9:
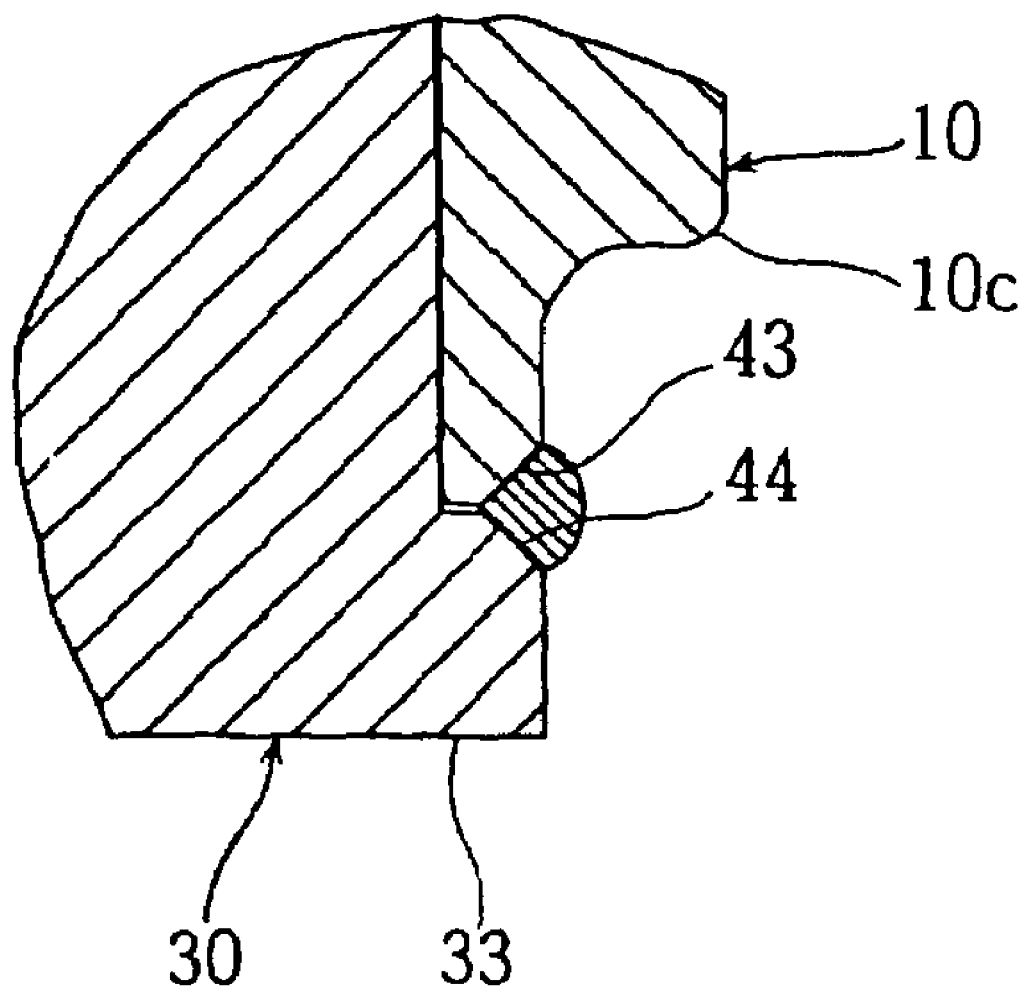
FIG. 9 is a sectional view of a joint portion of the down frame and the rear arm bracket.

FIGS. 1 to 9 are views for explaining a body frame of a motorcycle according to an embodiment of the present invention. FIG. 1 is a side view of a motorcycle in which the body frame of this embodiment is adopted, FIG. 2 is a side vie of a main frame, FIG. 3 is a sectional view (sectional view along line III—III of FIG. 2) of a head pipe unit portion of the main frame, FIG. 4 is a front view of a joint portion of the head pipe unit and a down frame, FIG. 5 is a plan view of a joint portion of the head pipe unit and rear arm brackets, FIG. 6 is a sectional side view (sectional view along line VI—VI of FIG. 8) of the down frame, FIG. 7 is a bottom view of a rear ends of the down frame, FIG. 8 is a sectional front view (sectional view along line VIII—VIII of FIG. 7) of left and right down frame sections, and FIG. 9 is a sectional view of a joint portion of the down frame sections and the rear arm brackets.

In the figures, reference numeral 1 denotes a motorcycle for a motocross race, a body frame 2 which is mounted with an engine unit 11 and includes a main frame 2a by which a front fork 4 and rear arms 7 are supported, sheet rails 27 for mounting a seat 13, and a sheet stay 28.

The front fork 4 is axially supported by a head pipe 3 located at front end of the main frame 2a so as to be able to be steered to the left and right, and a front wheel 5 is axially supported at a lower end of this front fork 4 and a steering handlebar 6 is fixed to an upper end thereof. In addition, the rear arms 7 are pivotably supported by rear arm brackets 10, which are located at rear ends of the main frame 2a, so as to be swingable vertically, and a rear wheel 8 is axially supported at rear ends of the rear arms 7.

A rear suspension unit 9 of a link type is suspended between the rear arms 7 and the main frame 2a. This suspension unit 9 is a suspension unit of a structure in which the rear arms 7 and a lower part at rear end of the main frame 2a are coupled by a link mechanism 9b, and the link mechanism 9b and an upper part at rear end of the main frame 2a are coupled via a cushion unit 9a.

An engine unit 11 of a traverse type, which is arranged with a crankshaft 11a thereof oriented toward a vehicle width direction, is mounted in a cradle surrounded by the main frame 2a. A drive sprocket 11b locked to an output shaft of the engine unit 11 is coupled to a driven sprocket of the rear wheel 8 via a not-shown chain. In addition, a fuel tank 12 is mounted above the engine unit 11 of the main frame 2a, and the sheet 13 is mounted behind the fuel tank 12. Note that a front side part of the sheet 13 is arranged so as to cover an upper surface of the fuel tank 12.

The main frame 2a includes four components, namely, a head pipe unit 20 consisting of an aluminum die-cast molded product, a down frame 21 consisting of an aluminum forged molded product, and left and right rear arm brackets 10, 10 also consisting of an aluminum forged molded product. Note that the head pipe unit 20 may also be an aluminum forged molded product.

The head pipe unit 20 has the head pipe 3 and a main frame main body 22 integrally formed with the head pipe 3, and this main frame main body 22 extends obliquely downward to the rear of the vehicle from the head pipe 3 and so as to expand in a vertical direction.

The main frame main body 22 is constituted by integrally forming, with aluminum die-casting, an upper main frame section (tank rail section) 23 extending obliquely downward to the rear of the vehicle from the upper end of the head pipe 3 substantially linearly, a lower main frame section 24 extending obliquely downward to the rear of the vehicle from the lower end of the head pipe 3 substantially linearly, and a gusset section 25 of a vertical wall shape closing a space formed by the upper and lower main frame sections 23, 24 and the head pipe 3. The fuel tank 12 is arranged and fixed on the upper main frame section 23.

As shown in FIG. 3, the upper and lower main frame sections 23, 24 are sections of a prism shape with a rectangular cross section. Then, in this case, a vehicle width dimension w1 and a height dimension h1 of the lower main frame section 24 are set larger than a vehicle width dimension w2 and a height dimension h2 of the upper main frame section 23. In addition, a vehicle width dimension w3 of the gusset section 25 is set smaller than the vehicle width dimensions w1 and w2 of the upper and lower main frame sections 23, 24. Consequently, the main frame main body 22 has an opened section generally I-shaped on a cross section thereof. Moreover, the head pipe 3 has opened sections opening at both ends in an axial direction.

Vehicle-mounted components and body components such as not-shown electrical equipment are attached to a recessed portion 22a formed by the upper and lower main frame sections 23, 24 and the gusset section 25. In addition, plural lightening openings 25a for reducing weight are routed to be formed in the gusset section 25. These lightening openings 25a also function as through-holes for arrangement of cables or electric wiring, and a wire cable 26 such as a clutch cable or a throttle cable is passed from one side to the other side of the vehicle using the lightening openings 25a.

An engine suspending bracket section 22c is integrally formed in a rear part at lower end of the gusset section 25 so as to project into the cradle, and a cylinder head 11c of the engine unit 11 is attached to the suspending bracket section 22c via a stay 29 of sheet metal.

A sheet bracket section 22b is integrally formed at a lower end and a rear end of the main frame main body 22 so as to extend obliquely upward. The pair of left and right sheet rails 27 made of steel pipe extending obliquely upward to the rear of the vehicle are bolted to be fixed to this sheet bracket section 22b, and rear ends of the sheet rails 27 and lower ends of the rear arm brackets 10 are connected by the sheet stay 28 made of steel pipe. In addition, an upper end of the cushion unit 9a is pivotably supported by the sheet bracket section 22b.

The down frame 21 is constituted by integrally forming left and right down frame sections 30, 30, which are formed so as to expand in the vehicle width direction from the front at lower end of the main frame main body 22 to extend downward and further extend rearward, upper, intermediate, and lower respective cross member sections 31, 32, and 33, which connect the left and right down frame sections 30 each other in the vehicle width direction, and a pair of left and right link bracket sections 34, 34, which project from the lower cross member section 33 toward the rear of the vehicle, with mold forging. Therefore, this down frame 21 has a shape having two closed spaces "a" when it is viewed from the front or above the vehicle. A link arm 9c of the link mechanism 9b is pivotably supported by the left and right link brackets 34, 34.

The left and right down frame sections 30 include slanted portions 30a, which expand to an outer side in the vehicle width direction from the lower end of the lower main frame section 24 and, then, continuously extend obliquely downward to the lower main frame section 24 in a side view, and horizontal portions 30b, which extend substantially horizontally from the lower end to the rear of the slanted portions 30a, and upper ends of the slanted portions 30a are welded and joined to left and right side surfaces of the lower end of the lower main frame section 24 over an entire periphery thereof.

As shown in FIG. 8, the respective down frame sections 30 have opened sections forming a generally downward C shape in a cross section in which upper ends of vertical walls 30c on the inner side of the vehicle and vertical walls 30d on the outer side of the vehicle are connected by upper side walls 30e, and rib portions 30f projecting upward are integrally formed on upper surfaces of the vertical walls 30c on the inner side of the vehicle. Consequently, strength and rigidity against bending load outwardly acting in a central part of the down frame sections can be increased with upper and lower ends as fulcrums, and deformation at the time of landing is prevented. Note that, as to across sectional shape of the down frame sections 30, various kinds of shapes can be adopted as described later.

In addition, lower surfaces 30d' of the vertical walls 30d on the outer side of the vehicle are located higher than lower surfaces 30c' of the vertical walls 30c on the inner side of the vehicle, whereby a bank angle is increased. Moreover, foaming resin 30g for closing recessed portions formed by the respective vertical walls 30c, 30d of the respective down frame sections 30 and the upper walls 30e is filled in the recessed portions. Consequently, mud is prevented from clogging the recessed portions.

Engine bracket sections 35, 36 projecting into the cradle are integrally formed following the rib portions 30f in the slanted portions 30a and the horizontal portions 30b of the respective down frame sections 30. A flange section of a crankcase 11d of the engine unit 11 is bolted to be fixed to the respective engine bracket sections 35, 36.

Maintenance openings 40 of generally a triangle shape in a plan view opening in the vertical direction are formed at rear ends of the horizontal portions 30b of the respective down frame sections 30. Maintenance such as adjustment of an attachment angle of a change pedal is performed using these openings 40.

These openings 40 are formed by branching the rear ends of the horizontal portions 30b into left and right two leg portions 30j, 30k and integrally connecting rear ends of the respective leg portions 30j, 30k to the lower cross member section 33.

The left and right rear arm brackets 10 are formed in generally a band plate shape extending in the vertical direction and, therefore, has an opened section in a cross section and is formed so as to expand to the outer side in the vehicle width direction on a lower side thereof viewed from the rear of the vehicle. In addition, a support boss section 10a supporting the rear arm 7 so as to be pivotable vertically is formed in a lower part of each rear arm bracket 10.

Then, upper ends 10b of the left and right rear arm brackets 10 are welded and joined to left and right sides of a rear end 23a of the upper main frame section 23 and a rear end 25c of the gusset section 25 over an entire periphery thereof. In addition, the lower ends 10c are welded and joined to the outer side of the vehicle of the lower cross member 33. As shown in FIG. 9, this joint portion of the rear arm bracket 10 and the lower cross member 33 forms chamfers 43, 44 extending to the joint portion of both the rear arm bracket 10 and the lower cross member 33 in a peripheral direction, and are welded and padded in a V groove formed by the respective chambers 43, 44.

Next, actions and advantages of this embodiment will be described.

According to this embodiment, the main frame 2a includes four components, namely, the head pipe unit 20, the down frame 21, and the left and right rear arm brackets 10, the head pipe unit 20 is an aluminum die-cast molded product, and the down frame 21 and the left and right rear arm brackets 10, 10 are aluminum forged molded products. Therefore, reduction of a body weight can be realized while strength equal to or more than the conventional iron frame is secured. That is, since the components are constituted by the aluminum die-cast molded product and the aluminum forged molded products, a thickness of portions not requiring strength can be reduced while a thickness of portions requiring strength is secured, and the body weight can be reduced compared with the case in which a body frame is constituted by the extrusion molded product.

In particular, in this type of body frame, since maximum load acts on the connection portion of the head pipe 3 and the lower main frame section 24 in the head pipe unit 20, in order to improve strength of the connection portion, the width dimension w1 and the height dimension h1 of the lower main frame section 24 are set large, and the width dimension w2 and the height dimension h2 are set relatively small for the upper main frame section 23. In this embodiment, since the head pipe unit 20 is an aluminum die-cast molded product, such adjustment of dimensions can be performed freely.

In addition, since a degree of freedom for shapes, sizes, and the like of the head pipe unit 20, the down frame 21, and the respective rear arm brackets 10 can be improved, the number of components can be reduced compared with the case in which a large number of extrusion molded products are welded and joined. As a result, welded portions can be reduced, fluctuation of strength and rigidity can be prevented, and cost can be controlled.

In this embodiment, since the head pipe unit 20 is an aluminum die-cast molded product, a section around a head pipe which tends to be complicated in shape can be easily formed integrally. In addition, since the down frame 21 and the respective rear arm brackets 10 are aluminum forged molded products, these components can be formed with a thickness and a sectional shape corresponding to an acting direction and a magnitude of load, and as a result, rigidity and strength can be increased.

In addition, in this embodiment, since a sectional shape of the head pipe unit 20, the down frame 21, and the left and right rear frame brackets 10 is a so-called opened section, a problem in that alumite treatment liquid, cleaning water, or the like remains inside the components at the time of frame manufacturing can be solved, and eventually, corrosion resistance can be improved and production efficiency can be improved. That is, in the case in which the above-mentioned aluminum pipe material is adopted, openings at both ends of the pipe material are closed. Thus, from the viewpoint of the entire frame, the frame has a closed sectional structure from which it is difficult to discharge liquid having entered the inside, and it is necessary to specially provide a drain hole for discharging alumite treatment liquid or the like remaining in the inside, which is disadvantageous in terms of strength. In addition, there is a concern that the pipe material corrodes easily if cleaning water or the like remains in the inside.

According to this embodiment, the main frame 2a has a structure in which the upper main frame section 23 extending obliquely downward to the rear of the vehicle from the upper end of the head pipe 3, the lower main frame section 24 extending downward to the rear of the vehicle from the lower end of the head pipe 3, and the gusset section 25 of a vertical wall shape closing the space surrounded by the head pipe 3 and the upper and lower main frame sections 23, 24 are integrally formed, welded portions can be reduced, fluctuation of strength can be prevented, and cost can be reduced.

In this embodiment, the vehicle width dimension w1 and the height dimension h1 of the lower main frame section 24 are set larger than the dimensions w2, h2 of the upper main frame section 23, and the vehicle width dimension w3 of the gusset section 25 is set smaller than the vehicle width dimensions w2, w1 of the upper and lower main frame sections 23, 24 and I-shaped in a section. Therefore, the entire frame can be made compact while strength and rigidity thereof are secured, and reduction of a body weight becomes possible. In particular, in this kind of motorcycle for a motocross race, large load acts on the connecting portion of the lower main frame section 24 and the head pipe 3 at the time of jumping. Strength and rigidity of this connecting portion can be increased, whereas reduction in weight of the entire frame can be realized by reducing the thickness of the upper main frame section 23 which does not require much strength.

On the other hand, rigidity of the entire frame may have different characteristics from the above-mentioned ones depending upon a use of a vehicle. In such a case, for example, it is also possible to set the vehicle width dimension w1 and the height dimension h1 of the lower main frame section 24 smaller than the dimensions w2, h2 of the upper main frame section 23.

Since the electrical equipment and body components are attached to the recessed portion 22a formed by the lower main frame sections 23, 24 and the gusset section 25, a layout space for the electrical equipment or the like can be easily secured by effectively using the recessed portion 22a, and in particular, a vehicle width can be made compact.

In this embodiment, since the lightening openings 25a for reducing weight are formed in the gusset section 25, and the wire cable 26 is arranged using the lightening holes 25a, the wire cable 26 can be arranged linearly by reducing its bending compared with the conventional case in which a wire cable is arranged in a guide pipe, and operation load can be reduced so much more for that.

In addition, since the engine suspending bracket section 22c is integrally formed with the gusset section 25, the number of components can be reduced compared with the case in which a separate bracket of sheet metal is welded and joined.

According to the body frame in accordance with this embodiment, since the left and right down frame sections 30 and the upper, intermediate, and lower cross member sections 31, 32, and 33 are integrally formed by an aluminum forged molded product in the down frame 21, welded portions can be eliminated, fluctuation of strength can be prevented, and the number of components can be reduced to realize reduction in cost.

In addition, since the left and right down frame sections 30 and the respective cross member sections 31 to 33 are integrally formed by forging, the entire down frame can be made in a closed shape, and deformation due to heat as in the case of welding can be eliminated. Further, post processing after forging can be made unnecessary, assembly accuracy of the engine unit 11 can be improved, and productivity can be improved. Moreover, strength and elongation of the entire down frame 21 can be increased, and shock resistance in the case in which the motorcycle jumps and hits a road surface strongly can be improved.

In this embodiment, since the pair of left and right link bracket sections 34, 34 projecting to the rear of the vehicle is integrally formed with the lower cross member section 33, the number of components can be reduced compared with the case in which a separate link bracket is welded. In addition, it becomes possible to easily form the respective link brackets 34 toward a direction advantageous with respect to load from the rear wheel 8. Incidentally, in the case in which a separate link bracket is welded, a direction in which the link bracket can be attached is limited by workability of welding, which may be disadvantageous with respect to load.

In this embodiment, since the leg portions 30j, 30k of a forked shape are integrally formed at the rear end of the left and right down frame sections 30, and the maintenance openings 40 opening in the vertical direction is formed by the leg portions 30j, 30k and the lower cross member section 33, the maintenance opening 40 can be integrally formed with the down frame sections 30, and the number of components can be reduced. Incidentally, conventionally, a maintenance opening is formed by welding and joining a cross pipe to a rear end of left and right down tubes and welding a separate pipe member to the cross pipe and the down tubes. Thus, there is a problem in that cost increases for the welding the pipe member.

Since the engine bracket sections 35, 36 are integrally formed with the left and right down frame sections 30, the number of components can be reduced compared with the case in which a separate bracket is welded. In addition, this is advantageous in terms of strength compared with the case in which the bracket is welded, and strength supporting the engine unit 11 can be increased.

In this embodiment, since the left and right down frame sections 30 are formed in a downward C shape, and the lower surfaces 30d' of the vertical walls 30d on the outer side of the vehicle are located higher than the lower surfaces 30c' of the vertical walls 30c on the inner side of the vehicle, it becomes possible to increase a bank angle, and strength against bending load in the vertical direction can be increased.

In addition, since the foaming resin 30g is filled in the recessed portions of the left and right down frame sections 30, mud clogging due to splashed water or the like can be prevented.

Note that, although the case of an irregular shape in which the lower surfaces 30d' of the vertical walls 30d on the outer side of the vehicle are placed higher than the lower surfaces 30c' of the vertical walls 30c on the inner side of the vehicle in the left and right down frame sections 30 in this embodiment, a sectional shape of the down frame sections of the present invention is not limited to this.

FIG. 10 shows various modifications of the sectional shape of the down frame section 30. FIG. 10(a) shows the case in which the section is formed in a downward C shape with the height dimensions of the vertical walls 45a, 45b on the inner side and the outer side of the vehicle set the same, and a vehicle width dimension of an upper side wall 45c set larger than the height dimensions of both the vertical walls 45a, 45b. In this example, a die cutting direction is set in the vertical direction (direction of arrow b). In addition, FIG. 10(b) shows the case in which the section is formed in a sidewise C shape opening to the inner side of the vehicle by connecting an upper side wall 46a and a lower side wall 46b with a vertical wall 46c on the outer side of the vehicle. Moreover, FIG. 10(c) shows the case in which the section is formed in an I shape by connecting the upper side wall 47a and the lower side wall 47b with a vertical wall 47c in the center on the vehicle width direction. Note that in the sections shown in FIGS. 10(b) and 10(c), the left and right down frame sections 30, 30 are separate, and the die cutting direction is set in the vehicle width direction (direction of arrow "a"). In any of the above-mentioned shapes, necessary strength can be secured while reduction in weight is realized.

Figure 11:
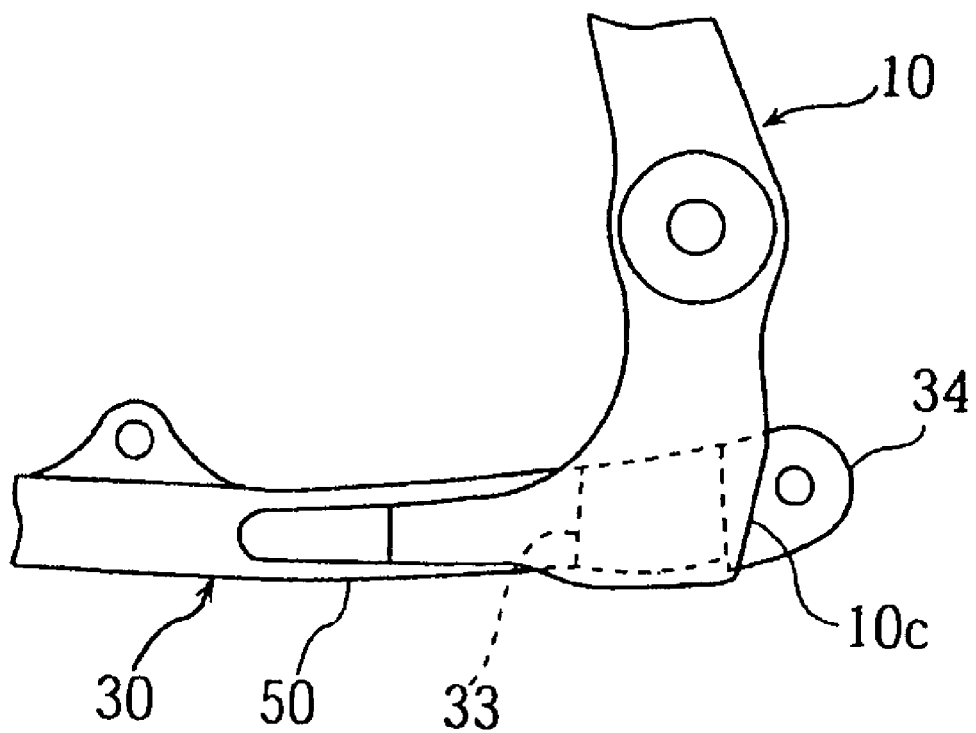
FIG. 11 is a side view showing a maintenance opening according to the modification of the embodiment.
Figure 12:
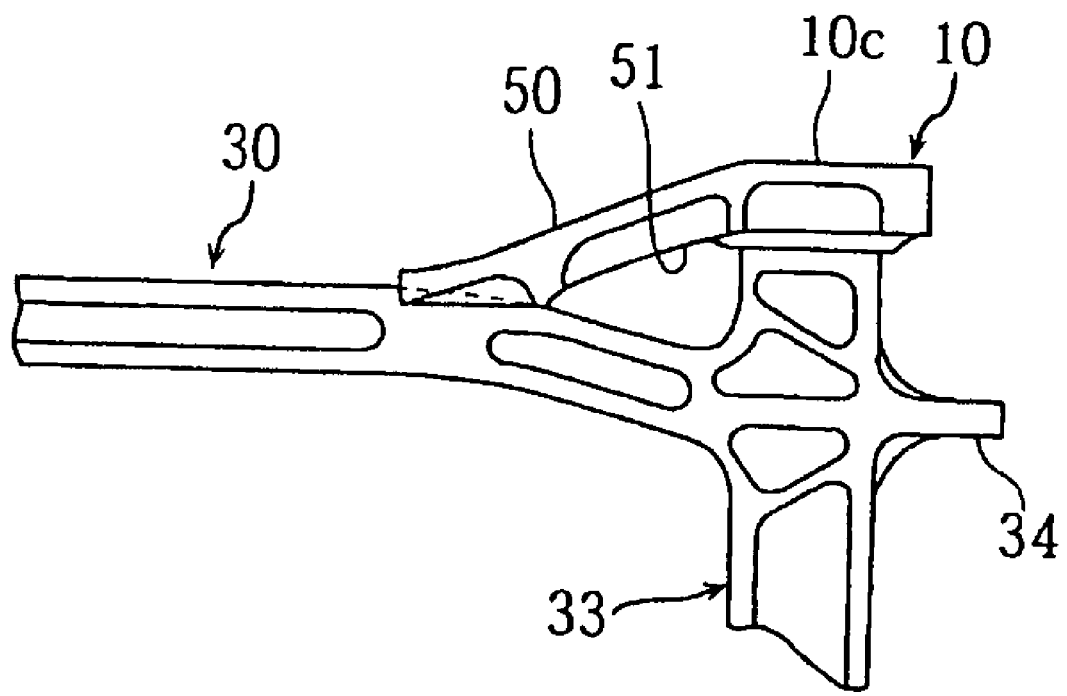
FIG. 12 is a bottom view of the maintenance opening.

In addition, although the case in which the maintenance openings 40 are formed by the respective leg portions 30j, 30k of the down frame sections 30 and the lower cross member section 33 is explained in the above-mentioned embodiment, the maintenance opening of the present invention may be formed as shown in FIGS. 11 and 12. That is, an arm portion 50 extending to the front of the vehicle is integrally formed with the lower end 10c of the rear arm bracket 10. Then, the lower end 10c of the rear arm bracket 10 may be welded and joined to the end of the cross member section 33 and the front end of the arm portion 50 may be welded and joined to the outer side wall of the down frame section 30 to form a maintenance opening 51 with the down frame section 30 and the cross member section 33. In such a case, it is possible to further increase strength around the opening 51.

An embodiment of the present invention will be hereinafter described based upon the accompanying drawings.

FIGS. 1 to 9 are views for explaining a body frame of a motorcycle according to an embodiment of the present invention. FIG. 1 is a side view of a motorcycle in which the body frame of this embodiment is adopted, FIG. 2 is a side view of a main frame, FIG. 3 is a sectional view (sectional view along line III—III of FIG. 2) of a head pipe unit portion of the main frame, FIG. 4 is a front view of a joint portion of the head pipe unit and a down frame, FIG. 5 is a plan view of a joint portion of the head pipe unit and rear arm brackets, FIG. 6 is a sectional side view (sectional view along line VI—VI of FIG. 8) of the down frame, FIG. 7 is a bottom view of a rear ends of the down frame, FIG. 8 is a sectional front view (sectional view along line VIII—VIII of FIG. 7) of left and right down frame sections, and FIG. 9 is a sectional view of a joint portion of the down frame sections and the rear arm brackets.

In the figures, reference numeral 1 denotes a motorcycle for a motocross race, a body frame 2 which is mounted with an engine unit 11 and includes a main frame 2a by which a front fork 4 and a rear arms 7 are supported, sheet rails 27 for mounting a seat 13, and a sheet stay 28.

The front fork 4 is axially supported by a head pipe 3 located at front end of the main frame 2a so as to be able to be steered to the left and right, and a front wheel 5 is axially supported at a lower end of this front fork 4 and a steering handlebar 6 is fixed to an upper end thereof. In addition, the rear arms 7 are pivotably supported by rear arm brackets 10, which are located at rear ends of the main frame 2a, so as to be swingable vertically, and a rear wheel 8 is axially supported at rear ends of the rear arms 7.

A rear suspension unit 9 of a link type is suspended between the rear arms 7 and the main frame 2a. This suspension unit 9 is a suspension unit of a structure in which the rear arms 7 and a lower part at rear end of the main frame 2a are coupled by a link mechanism 9b, and the link mechanism 9b and an upper part at rear end of the main frame 2a are coupled via a cushion unit 9a.

An engine unit 11 of a traverse type, which is arranged with a crankshaft 11a thereof oriented toward a vehicle width direction, is mounted in a cradle surrounded by the main frame 2a. A drive sprocket 11b locked to an output shaft of the engine unit 11 is coupled to a driven sprocket of the rear wheel 8 via a not-shown chain. In addition, a fuel tank 12 is mounted above the engine unit 11 of the main frame 2a, and the sheet 13 is mounted behind the fuel tank 12. Note that a front side part of the sheet 13 is arranged so as to cover an upper surface of the fuel tank 12.

The main frame 2a includes four components, namely, a head pipe unit 20 consisting of an aluminum die-cast molded product, a down frame 21 consisting of an aluminum forged molded product, and left and right rear arm brackets 10, 10 also consisting of an aluminum forged molded product. Note that the head pipe unit 20 may also be an aluminum forged molded product.

The head pipe unit 20 has the head pipe 3 and a main frame main body 22 integrally formed with the head pipe 3, and this main frame main body 22 extends obliquely downward to the rear of the vehicle from the head pipe 3 and so as to expand in a vertical direction.

The main frame main body 22 is constituted by integrally forming, with aluminum die-casting, an upper main frame section (tank rail section) 23 extending obliquely downward to the rear of the vehicle from the upper end of the head pipe 3 substantially linearly, a lower main frame section 24 extending obliquely downward to the rear of the vehicle from the lower end of the head pipe 3 substantially linearly, and a gusset section 25 of a vertical wall shape closing a space formed by the upper and lower main frame sections 23, 24 and the head pipe 3. The fuel tank 12 is arranged and fixed on the upper main frame section 23.

As shown in FIG. 3, the upper and lower main frame sections 23, 24 are sections of a prism shape with a rectangular cross section. Then, in this case, a vehicle width dimension w1 and a height dimension h1 of the lower main frame section 24 are set larger than a vehicle width dimension w2 and a height dimension h2 of the upper main frame section 23. In addition, a vehicle width dimension w3 of the gusset section 25 is set smaller than the vehicle width dimensions w1 and w2 of the upper and lower main frame sections 23, 24. Consequently, the main frame main body 22 has an opened section generally I-shaped on a cross section thereof. Moreover, the head pipe 3 has opened sections opening at both ends in an axial direction.

Vehicle-mounted components and body components such as not-shown electrical equipment are attached to a recessed portion 22a formed by the upper and lower main frame sections 23, 24 and the gusset section 25. In addition, plural lightening openings 25a for reducing weight are routed to be formed in the gusset section 25. These lightening openings 25a also function as through-holes for arrangement of cables or electric wiring, and a wire cable 26 such as a clutch cable or a throttle cable is passed from one side to the other side of the vehicle using the lightening openings 25a.

An engine suspending bracket section 22c is integrally formed in a rear part at lower end of the gusset section 25 so as to project into the cradle, and a cylinder head 11c of the engine unit 11 is attached to the suspending bracket section 22c via a stay 29 of sheet metal.

A sheet bracket section 22b is integrally formed at a lower end and a rear end of the main frame main body 22 so as to extend obliquely upward. The pair of left and right sheet rails 27 made of steel pipe extending obliquely upward to the rear of the vehicle are bolted to be fixed to this sheet bracket section 22b, and rear ends of the sheet rails 27 and lower ends of the rear arm brackets 10 are connected by the sheet stay 28 made of steel pipe. In addition, an upper end of the cushion unit 9a is pivotably supported by the sheet bracket section 22b.

The down frame 21 is constituted by integrally forming left and right down frame sections 30, 30, which are formed so as to expand in the vehicle width direction from the front at lower end of the main frame main body 22 to extend downward and further extend rearward, upper, intermediate, and lower respective cross member sections 31, 32, and 33, which connect the left and right down frame sections 30 each other, and a pair of left and right link bracket sections 34, 34, which project from the lower cross member section 33 toward the rear of the vehicle, with mold forging. Therefore, this down frame 21 has a shape having two closed spaces "a" when it is viewed from the front or above the vehicle. A link arm 9c of the link mechanism 9b is pivotably supported by the left and right link brackets 34, 34.

The left and right down frame sections 30 include slanted portions 30a, which expand to an outer side in the vehicle width direction from the lower end of the lower main frame section 24 and, then, continuously extend obliquely downward to the lower main frame section 24 in a side view, and horizontal portions 30b, which extend substantially horizontally from the lower end to the rear of the slanted portions 30a, and upper ends of the slanted portions 30a are welded and joined to left and right side surfaces of the lower end of the lower main frame section 24 over an entire periphery thereof.

As shown in FIG. 8, the respective down frame sections 30 have opened sections forming a generally downward C shape in a cross section in which upper ends of vertical walls 30c on the inner side of the vehicle and vertical walls 30d on the outer side of the vehicle are connected by upper side walls 30e, and rib portions 3 of projecting upward are integrally formed on upper surfaces of the vertical walls 30c on the inner side of the vehicle. Consequently, strength and rigidity against bending load outwardly acting in a central part of the down frame sections can be increased with upper and lower ends as fulcrums, and deformation at the time of landing is prevented. Note that, as to a cross sectional shape of the down frame sections 30, various kinds of shapes can be adopted as described later.

In addition, lower surfaces 30*d'* of the vertical walls 30*d* on the outer side of the vehicle are located higher than lower surfaces 30*c'* of the vertical walls 30*c* on the inner side of the vehicle, whereby a bank angle is increased. Moreover, foaming resin 30*g* for closing recessed portions formed by the respective vertical walls 30*c*, 30*d* of the respective down frame sections 30 and the upper walls 30*e* is filled in the recessed portions. Consequently, mud is prevented from clogging the recessed portions.

Engine bracket sections 35, 36 projecting into the cradle are integrally formed following the rib portions 30*f* in the slanted portions 30*a* and the horizontal portions 30*b* of the respective down frame sections 30. A flange section of a crankcase 11*d* of the engine unit 11 is bolted to be fixed to the respective engine bracket sections 35, 36.

Maintenance openings 40 of generally a triangle shape in a plan view opening in the vertical direction are formed at rear ends of the horizontal portions 30*b* of the respective down frame sections 30. Maintenance such as adjustment of an attachment angle of a change pedal is performed using these openings 40.

These opening 40*b* are formed by branching the rear ends of the horizontal portions 30*b* into left and right two leg portions 30*j*, 30*k* and integrally connecting rear ends of the respective leg portions 30*j*, 30*k* to the lower cross member section 33.

The left and right rear arm brackets 10 are formed in generally a band plate shape extending in the vertical direction and, therefore, has an opened section in a cross section and is formed so as to expand to the outer side in the vehicle width direction on a lower side thereof viewed from the rear of the vehicle. In addition, a support boss section 10*a* supporting the rear arm 7 so as to be pivotable vertically is formed in a lower part of each rear arm bracket 10.

Then, upper ends 10*b* of the left and right rear arm brackets 10 are welded and joined to left and right sides of a rear end 23*a* of the upper main frame section 23 and a rear end 25*c* of the gusset section 25 over an entire periphery thereof. In addition, the lower ends 10*c* are welded and joined to the outer side of the vehicle of the lower cross member 33. As shown in FIG. 9, this joint portion of the rear arm bracket 10 and the lower cross member 33 forms chamfers 43, 44 extending to the joint portion of both the rear arm bracket 10 and the lower cross member 33 in a peripheral direction, and are welded and padded in a V groove formed by the respective chambers 43, 44.

Next, actions and advantages of this embodiment will be described.

According to this embodiment, the main frame 2*a* includes four components, namely, the head pipe unit 20, the down frame 21, and the left and right rear arm brackets 10, the head pipe unit 20 is an aluminum die-cast molded product, and the down frame 21 and the left and right rear arm brackets 10, 10 are aluminum forged molded products. Therefore, reduction of a body weight can be realized while strength equal to or more than the conventional iron frame is secured. That is, since the components are constituted by the aluminum die-cast molded product and the aluminum forged molded products, a thickness of portions not requiring strength can be reduced while a thickness of portions requiring strength is secured, and the body weight can be reduced compared with the case in which a body frame is constituted by the extrusion molded product.

In particular, in this type of body frame, since maximum load acts on the connection portion of the head pipe 3 and the lower main frame section 24 in the head pipe unit 20, in order to improve strength of the connection portion, the width dimension w1 and the height dimension h1 of the lower main frame section 24 are set large, and the width dimension w2 and the height dimension h2 are set relatively small for the upper main frame section 23. In this embodiment, since the head pipe unit 20 is an aluminum die-cast molded product, such adjustment of dimensions can be performed freely.

In addition, since a degree of freedom for shapes, sizes, and the like of the head pipe unit 20, the down frame 21, and the respective rear arm brackets 10 can be improved, the number of components can be reduced compared with the case in which a large number of extrusion molded products are welded and joined. As a result, welded portions can be reduced, fluctuation of strength and rigidity can be prevented, and cost can be controlled.

In this embodiment, since the head pipe unit 20 is an aluminum die-cast molded product, a section around a head pipe which tends to be complicated in shape can be easily formed integrally. In addition, since the down frame 21 and the respective rear arm brackets 10 are aluminum forged molded products, these components can be formed with a thickness and a sectional shape corresponding to an acting direction and a magnitude of load, and as a result, rigidity and strength can be increased.

In addition, in this embodiment, since a sectional shape of the head pipe unit 20, the down frame 21, and the left and right rear frame brackets 10 is a so-called opened section, a problem in that alumite treatment liquid, cleaning water, or the like remains inside the components at the time of frame manufacturing can be solved, and eventually, corrosion resistance can be improved and production efficiency can be improved. That is, in the case in which the above-mentioned aluminum pipe material is adopted, openings at both ends of the pipe material are closed. Thus, from the viewpoint of the entire frame, the frame has a closed sectional structure from which it is difficult to discharge liquid having entered the inside, and it is necessary to specially provide a drain hole for discharging alumite treatment liquid or the like remaining in the inside, which is disadvantageous in terms of strength. In addition, there is a concern that the pipe material corrodes easily if cleaning water or the like remains in the inside.

According to this embodiment, the main frame 2*a* has a structure in which the upper main frame section 23 extending obliquely downward to the rear of the vehicle from the upper end of the head pipe 3, the lower main frame section 24 extending downward to the rear of the vehicle from the lower end of the head pipe 3, and the gusset section 25 of a vertical wall shape closing the space surrounded by the head pipe 3 and the upper and lower main frame sections 23, 24 are integrally formed, welded portions can be reduced, fluctuation of strength can be prevented, and cost can be reduced.

In this embodiment, the vehicle width dimension w1 and the height dimension h1 of the lower main frame section 24 are set larger than the dimensions w2, h2 of the upper main frame section 23, and the vehicle width dimension w3 of the gusset section 25 is set smaller than the vehicle width dimensions w2, w1 of the upper and lower main frame sections 23, 24 and I-shaped in a section. Therefore, the entire frame can be made compact while strength and rigidity thereof are secured, and reduction of a body weight becomes possible. In particular, in this kind of motorcycle for a motocross race, large load acts on the connecting portion of the lower main frame section 24 and the head pipe 3 at the time of jumping. Strength and rigidity of this connecting portion can be increased, whereas reduction in weight of the entire frame can be realized by reducing the thickness of the upper main frame section 23 which does not require much strength.

On the other hand, rigidity of the entire frame may have different characteristics from the above-mentioned ones depending upon a use of a vehicle. In such a case, for example, it is also possible to set the vehicle width dimension w1 and the height dimension h1 of the lower main frame section 24 smaller than the dimensions w2, h2 of the upper main frame section 23.

Since the electrical equipment and body components are attached to the recessed portion 22*a* formed by the upper and lower main frame sections 23, 24 and the gusset section 25, a layout space for the electrical equipment or the like can be easily secured by effectively using the recessed portion 22*a*, and in particular, a vehicle width can be made compact.

In this embodiment, since the lightening openings 25*a* for reducing weight are formed in the gusset section 25, and the wire cable 26 is arranged using the lightening holes 25*a*, the wire cable 26 can be arranged linearly by reducing its bending compared with the conventional case in which a wire cable is arranged in a guide pipe, and operation load can be reduced so much more for that.

In addition, since the engine suspending bracket section 22*c* is integrally formed with the gusset section 25, the number of components can be reduced compared with the case in which a separate bracket of sheet metal is welded and joined.

According to the body frame in accordance with this embodiment, since the left and right down frame sections 30 and the upper, intermediate, and lower cross member sections 31, 32, and 33 which connect the left and right down frame section 30 each other are integrally formed by an aluminum forged molded product in the down frame 21, welded portions can be eliminated, fluctuation of strength can be prevented, and the number of components can be reduced to realize reduction in cost.

In addition, since the left and right down frame sections 30 and the respective cross member sections 31 to 33 are integrally formed by forging, the entire down frame can be made in a closed shape, and deformation due to heat as in the case of welding can be eliminated. Further, post processing after forging can be made unnecessary, assembly accuracy of the engine unit 11 can be improved, and productivity can be improved. Moreover, strength and elongation of the entire down frame 21 can be increased, and shock resistance in the case in which the motorcycle jumps and hits a road surface strongly can be improved.

In this embodiment, since the pair of left and right link bracket sections 34, 34 projecting to the rear of the vehicle is integrally formed with the lower cross member section 33, the number of components can be reduced compared with the case in which a separate link bracket is welded. In addition, it becomes possible to easily form the respective link brackets 34 toward a direction advantageous with respect to load from the rear wheel 8. Incidentally, in the case in which a separate link bracket is welded, a direction in which the link bracket can be attached is limited by workability of welding, which may be disadvantageous with respect to load.

In this embodiment, since the leg portions 30*j*, 30*k* of a forked shape are integrally formed at the rear end of the left and right down frame sections 30, and the maintenance openings 40 opening in the vertical direction is formed by the leg portions 30*j*, 30*k* and the lower cross member section 33, the maintenance opening 40 can be integrally formed with the down frame sections 30, and the number of components can be reduced. Incidentally, conventionally, a maintenance opening is formed by welding and joining a cross pipe to a rear end of left and right down tubes and welding a separate pipe member to the cross pipe and the down tubes. Thus, there is a problem in that cost increases for the welding the pipe member.

Since the engine bracket sections 35, 36 are integrally formed with the left and right down frame sections 30, the number of components can be reduced compared with the case in which a separate bracket is welded. In addition, this is advantageous in terms of strength compared with the case in which the bracket is welded, and strength supporting the engine unit 11 can be increased.

In this embodiment, since the left and right down frame sections 30 are formed in a downward C shape, and the lower surfaces 30*d'* of the vertical walls 30*d* on the outer side of the vehicle are located higher than the lower surfaces 30*c'* of the vertical walls 30*c* on the inner side of the vehicle, it becomes possible to increase a bank angle, and strength against bending load in the vertical direction can be increased.

In addition, since the foaming resin 30*g* is filled in the recessed portions of the left and right down frame sections 30, mud clogging due to splashed water or the like can be prevented.

Note that, although the case of an irregular shape in which the lower surfaces 30*d'* of the vertical walls 30*d* on the outer side of the vehicle are placed higher than the lower surfaces 30*c'* of the vertical walls 30*c* on the inner side of the vehicle in the left and right down frame sections 30 in this embodiment, a sectional shape of the down frame sections of the present invention is not limited to this.

FIG. 10 shows various modifications of the sectional shape of the down frame section 30. FIG. 10(*a*) shows the case in which the section is formed in a downward C shape with the height dimensions of the vertical walls 45*a*, 45*b* on the inner side and the outer side of the vehicle set the same, and a vehicle width dimension of an upper side wall 45*c* set larger than the height dimensions of both the vertical walls 45*a*, 45*b*. In this example, a die cutting direction is set in the vertical direction (direction of arrow b).

In addition, FIG. 10(*b*) shows the case in which the section is formed in a sidewise C shape opening to the inner side of the vehicle by connecting an upper side wall 46*a* and a lower side wall 46*b* with a vertical wall 46*c* on the outer side of the vehicle. Moreover, FIG. 10(*c*) shows the case in which the section is formed in an I shape by connecting the upper side wall 47*a* and the lower side wall 47*b* with a vertical wall in the center on the vehicle width direction. Note that in the sections shown in FIGS. 10(*b*) and 10(*c*), the left and right down frame sections 30, 30 are separate, and the die cutting direction is set in the vehicle width direction (direction of arrow "a"). In any of the above-mentioned shapes, necessary strength can be secured while reduction in weight is realized.

In addition, although the case in which the maintenance openings 40 are formed by the respective leg portions 30*j*, 30*k* of the down frame sections 30 and the lower cross member section 33 is explained in the above-mentioned embodiment, the maintenance opening of the present invention may be formed as shown in FIGS. 11 and 12. That is, an arm portion 50 extending to the front of the vehicle is integrally formed with the lower end 10c of the rear arm bracket 10. Then, the lower end 10c of the rear arm bracket 10 may be welded and joined to the end of the cross member section 33 and the front end of the arm portion 50 may be welded and joined to the outer side wall of the down frame section 30 to form a maintenance opening 51 with the down frame section 30 and the cross member section 33. In such a case, it is possible to further increase strength around the opening 51.

INDUSTRIAL APPLICABILITY

According to an embodiment of the present invention, since at least one of the head pipe unit, the down frame, and the rear arm bracket, which constitute the main frame, is an aluminum die-cast molded product, and the rest are aluminum forged molded produce, or all of these are aluminum forged molded products, reduction of a body weight can be realized while strength equal to or more than the conventional iron frame is secured. That is, since these are an aluminum die-cast molded product and an aluminum forged molded product manufactured using a mold, and a thickness of portions not required can be reduced while a thickness of portions required in terms of strength is secured, and a weight of a body can be reduced compared with the case in which a body frame is constituted by the extrusion molded product.

In addition, since a part of the body components are constituted by a die-cast molded product and the rest are constituted by a forged molded product, or all of them are constituted by an aluminum forged molded product, a degree of freedom with respect to a shape, a size, and the like of a frame can be improved, and the number of components can be reduced compared with the case in which a large number of extrusion molded products are welded and joined. As a result, welded portions can be reduced, fluctuation of strength and rigidity can be prevented, and cost can be controlled.

According to an embodiment of the present invention, since the head pipe unit is an aluminum die-cast molded product or an aluminum forged molded product, a section around a head pipe which tends to be complicated in shape can be easily formed integrally. In addition, since the down frame and the respective rear arm brackets are aluminum forged products, these components can be formed with a sectional shape corresponding to a direction and a magnitude of acting load, and rigidity and strength can be increased.

Also, since a sectional shape of the head pipe unit, the down frame, and the rear arm brackets is an opened section, a problem in that alumite treatment liquid, cleaning water, or the like remains inside the components at the time of frame manufacturing can be solved, and eventually, corrosion resistance can be improved and production efficiency can be improved. Incidentally, in the case in which the aluminum pipe material is adopted, a drain hole for discharging alumite treatment liquid or the like having entered the inside is necessary, which is disadvantageous in terms of rigidity and strength of the frame.

According to an embodiment of the present invention, there is provided the head pipe unit generally I-shaped in a cross section thereof which is constituted by integrally forming the upper main frame section extending to the rear of the vehicle from the upper end of the head pipe, the lower main frame section extending downward to the rear of the vehicle from the lower end of the head pipe, and the gusset sections of a vertical wall shape for closing a space surrounded by the head pipe and the upper and lower main frame sections. Therefore, molded portions around the head pipe can be eliminated, fluctuation of strength can be prevented, and cost can be reduced.

In addition, since the head pipe connecting portion of the head pipe unit is I-shaped in a section thereof, the entire frame can be made compact while strength and rigidity are secured, and reduction of a body weight becomes possible.

According to the body frame of the present invention, since the down frame is constituted by integrally forming the left and right down frame sections and the upper and lower cross member sections, which connect the left and right down frame sections each other, with mold forging, molded portions can be reduced, fluctuation of strength can be prevented, and the number of components can be reduced to realize reduction in cost.

In addition, since the left and right down frame sections and the upper and lower cross member sections are integrally formed, the entire down frame can be made in a closed shape, and deformation in forged molding can be controlled, and post processing after forging can be made unnecessary. As a result, assembly accuracy of the engine unit can be improved, and productivity can be improved.

Moreover, since the down frame is a forged molded product, and rigidity and strength as well as elongation of the entire down frame can be increased by increasing a thickness of portions on which large load acts, adopting a sectional shape with high rigidity, or the like.

Further, since the head pipe is an aluminum die-cast molded product or an aluminum forged molded product, a section around a head pipe which tends to be complicated in shape and increased in size can be easily formed integrally.

In addition, since the head pipe unit is an aluminum die-cast molded product or an aluminum forged molded product, it is possible to set a thickness of each portion freely and form a hole for reducing weight in the gusset section. Further, it is easy to set a thickness of the lower main frame section larger than that of the upper main frame section, a thickness of portions requiring large strength can be increased and a thickness of portions not requiring large strength can be decreased, and reduction of a body weight can be realized.

According to an embodiment of the present invention, since vehicle-mounted components such as electrical equipment or body components are attached to the recessed portion formed by the upper and lower main frames and the gusset section, a layout space for the electrical equipment or the like can be easily secured by effectively using the recessed portion, and the entire body can be made compact.

Figure 13:
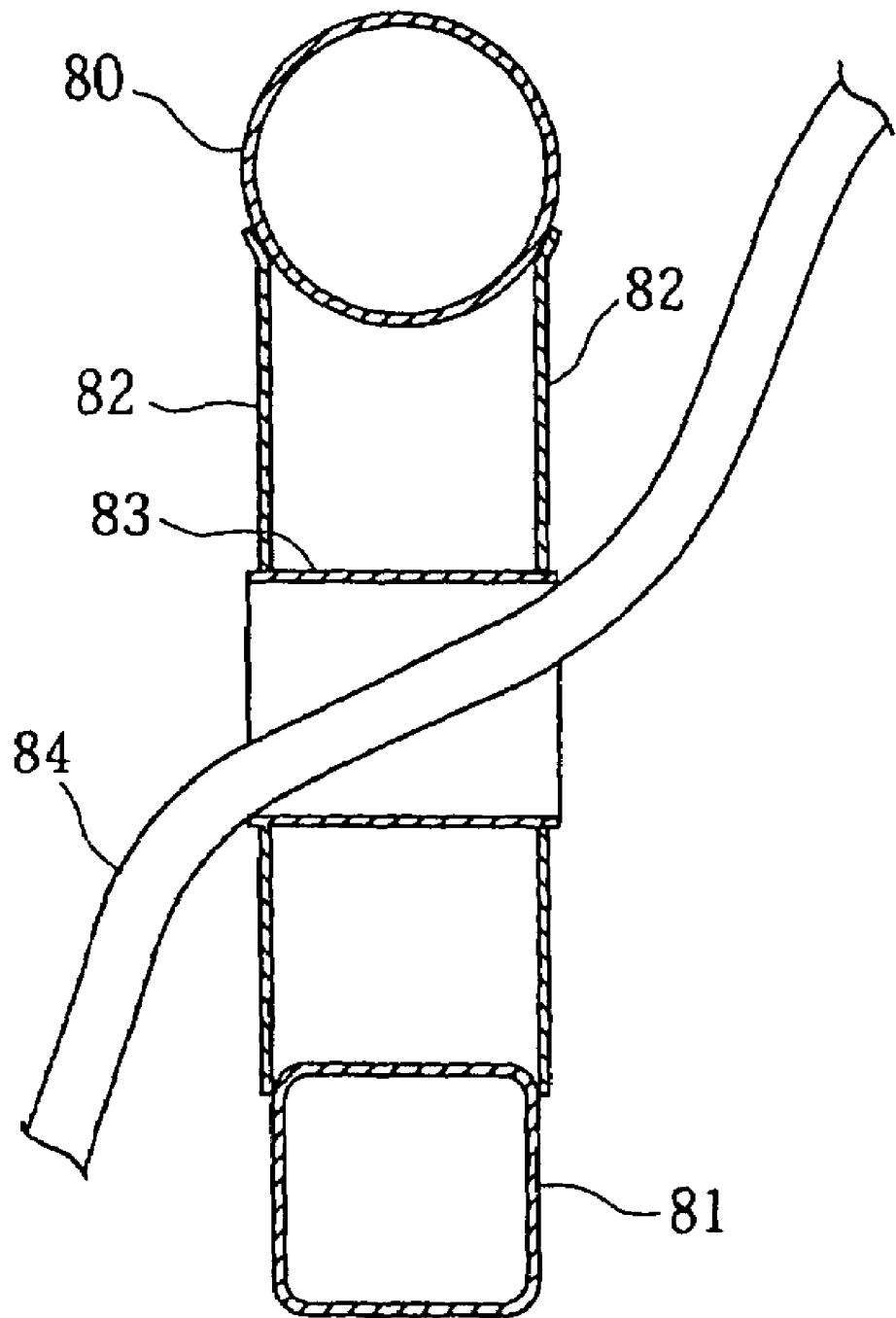
FIG. 13 is a sectional view showing a conventional general iron body frame.

Moreover, since through-holes for arrangement of an operation cable, a wire cable or the like can be arranged substantially linearly by reducing bending in arranging the same, and operation load can be reduced. Incidentally, in the case of the conventional structure shown in FIG. 13, there is a problem in that, if the wire cable 84 is arranged through the guide pipe 83 arranged between the gussets 82, bending of the wire cable 84 tends to be large, and operation load is increased.

Furthermore, since the engine suspending bracket section is integrally formed with the gusset section, the number of components can be reduced compared with the case in which a separate bracket of sheet metal is welded and joined.

According to an embodiment of the present invention, since the pair of left and right link bracket sections projecting to the rear of the vehicle are integrally formed with the lower cross member section connecting the rear ends of the left and right down frame sections each other, the number of components can be reduced compared with the case in which a separate link bracket is welded.

In addition, it becomes possible to form the link bracket section toward a direction advantageous with respect to load from the rear wheel. Incidentally, in the case in which a separate link bracket is welded, a direction in which the link bracket can be welded is limited depending upon a frame shape around it, it may be inevitable to join the link bracket in a direction disadvantageous with respect to load.

Also, since a maintenance opening for change pedal opening in a vertical direction is formed in a connecting portion of rear ends of the left and right down frame sections and the lower cross member section or in a connecting portion of the rear ends, the lower cross member section, and lower ends of the rear arm brackets, the maintenance opening can be formed with a simple structure and without increasing the number of components. That is, conventionally, a maintenance opening is formed by welding a separate pipe member, and there is a problem in that cost increases for welding the pipe member.

Moreover, since the engine bracket section is integrally formed with the left and right down frame sections, the number of components can be reduced compared with the case in which a separate bracket is welded. In addition, this is advantageous in terms of strength compared with the case in which the bracket is welded, and strength supporting the engine can be increased.

According to an embodiment of the present invention, since the left and right down frame sections have a generally downward C shape, and a lower surface of a vertical wall on an outer side of the vehicle is placed higher than a lower surface of a vertical wall on an inner side of the vehicle, it becomes possible to increase a bank angle.

Also, since the cover is disposed or foaming resin is filled in the downward recessed portions of the left and right down frame sections, mud clogging can be prevented.

The invention claimed is:

1. A body frame for a motorcycle comprising:
   a head pipe unit which extends obliquely downward to a rear of a vehicle from a head pipe and so as to expand in a vertical direction;
   a down frame which is connected to a front part at a lower end of the head pipe unit to extend downward and further extends to the rear of the vehicle, the down frame being constituted by integrally forming left and right down frame sections and cross member sections which connect the left and right down frame sections to each other, with mold forming, and the left and right down frame sections having a sectional shape opening in a vertical direction; and
   rear arm brackets which are stretched and connected to a rear end of the down frame and a rear part at the lower end of the head pipe unit,
   wherein at least one of the head pipe unit, the down frame and the rear arm brackets is an aluminum die-cast molded product and the rest are aluminum forged molded products, or wherein all of the head pipe unit, the down frame and the rear arm brackets are aluminum forged molded products.

2. The body frame for a motorcycle according to claim 1, wherein the head pipe unit is an aluminum die-cast molded product or an aluminum forged molded product, and the down frame and the rear arm brackets are aluminum forged molded product.

3. The body frame for a motorcycle according to claim 2, wherein a sectional shape of the head pipe unit, the down frame, and the rear arm brackets is an opened section.

4. The body frame for a motorcycle according to claim 3, wherein the head pipe unit is a head pipe unit generally I-shaped in a cross section thereof which is constituted by integrally forming an upper main frame section with a rectangular shape in a section thereof extending obliquely downward to the rear of the vehicle from an upper end of the head pipe, a lower main frame section with a rectangular shape in a section thereof extending downward to the rear of the vehicle from the lower end of the head pipe, and gusset sections of a vertical wall shape which closes a space surrounded by the head pipe and the upper and lower main frame sections and whose vehicle width dimension is set smaller than a vehicle width dimension of the main frame sections.

5. A body frame for a motorcycle comprising:
   a head pipe unit constituted by joining a frame member to a head pipe;
   a down frame extending downward to a rear of a vehicle from a front part at a lower end of the head pipe unit; and
   rear arm brackets connecting the down frame and a rear part at a lower end of the head pipe unit, wherein the down frame is constituted by integrally forming left and right down frame sections and upper and lower cross member sections, which connect the left and right down frame sections to each other, with mold forging, and the left and right down frame sections having a sectional shape opening in a vertical direction.

6. The body frame for a motorcycle according to claim 5, wherein the lower cross member section connects rear ends of the left and right down frame sections to each other, and a pair of left and right link bracket sections supporting a rear wheel suspending device are integrally formed in the lower cross member section so as to protrude to the rear of the vehicle.

7. The body frame for a motorcycle according to claim 6, wherein a maintenance opening for change pedal opening in a vertical direction is formed in a connecting portion of rear ends of the left and right down frame sections and the lower cross member section or in a connecting portion of the rear ends, the lower cross member section, and lower ends of the rear arm brackets.

8. The body frame for a motorcycle according to claim 7, wherein an engine bracket section is integrally formed with the left and right down frame sections.

9. The body frame for a motorcycle according to claim 8, wherein the left and right down frame sections have a sectional shape of a generally downward C shape and are formed such that a lower surface of a vertical wall on an outer side of the vehicle is placed higher than a lower surface of a vertical wall on an inner side of the vehicle.

10. The body frame for a motorcycle according to claim 9, wherein a cover is disposed in a recessed portion opening downward of the left and right down frame sections so as to cover the recessed portion or foaming resin is filled in the recessed portion.

11. The body frame for a motorcycle according to claim 1, further comprising a front fork and rear arms.

12. The body frame for a motorcycle according to claim 1, further comprising an engine unit to support the body frame.

13. The body frame for a motorcycle according to claim 11, further comprising a main frame to support the front fork and rear arms.

* * * * *